`United States Patent Office`  3,205,353
Patented Sept. 7, 1965

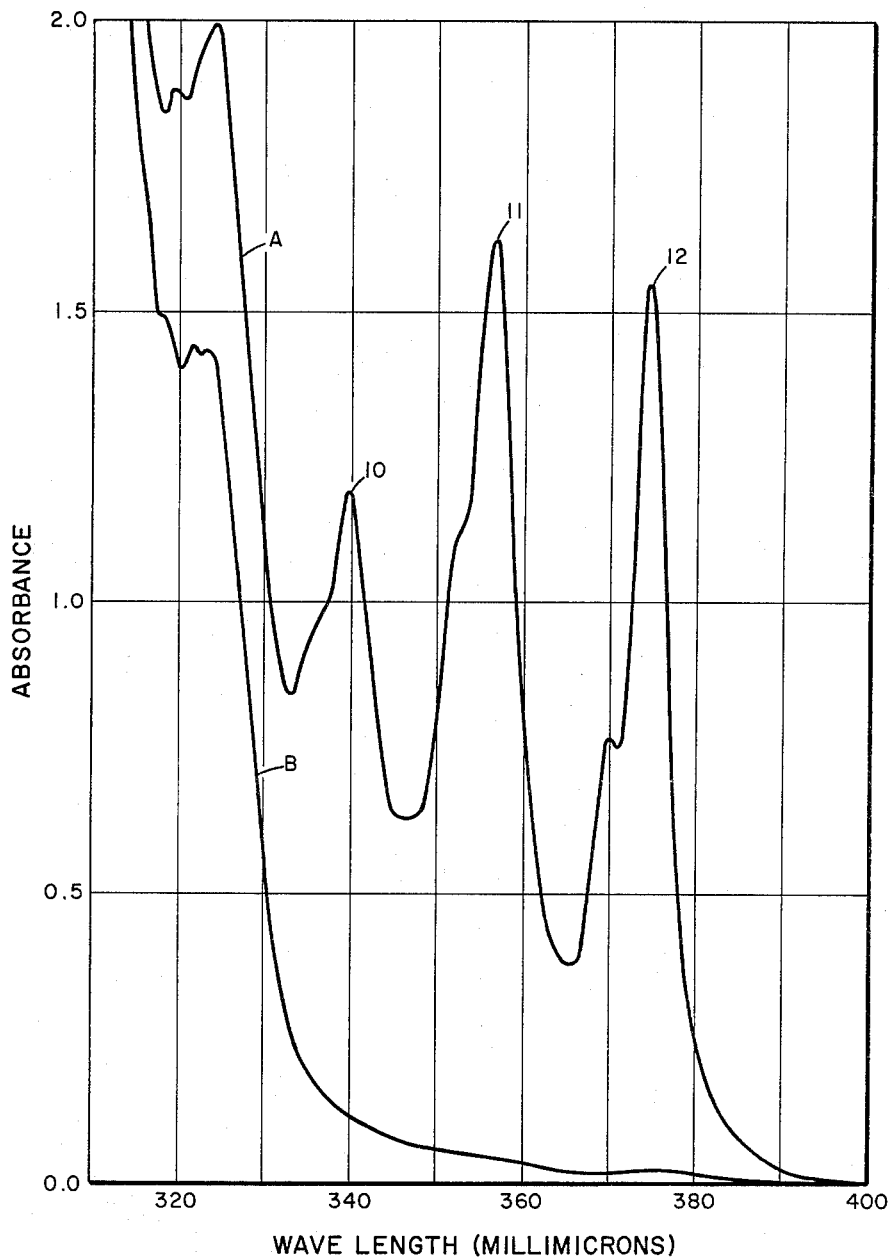

3,205,353
DETERMINATION OF CONTAMINATION OF UNDERGROUND FORMATION SAMPLES BY DRILLING FLUID USING RADIATION ABSORPTION ANALYSIS METHODS
Ellis E. Bray, Cedar Hill, Tex., assignor to Socony Mobil Oil Company, Inc., a corporation of New York
Filed Apr. 2, 1963, Ser. No. 269,950
8 Claims. (Cl. 250—43.5)

This invention relates to drilling in earth formations and relates more particularly to a method for detecting contamination of samples from the earth formations by oil contained in the drilling fluid.

In procedures involving mechanical penetration of an earth formation, a drilling fluid is employed. For example, during the rotary drilling of an oil well, a drilling fluid is employed for the purposes of imposing a hydrostatic pressure upon the formation to prevent escape of fluid therefrom to the well and of lubricating the drill bit. Further, for example, during the coring of an earth formation for the specific purpose of obtaining a core, or sample, therefrom for analysis, a drilling fluid is also employed. While aqueous drilling fluids can be employed in these operations, drilling fluids which contain an oil as one of its essential ingredients are being more frequently employed.

The cuttings obtained during drilling of a well and the cores obtained by coring are examined to obtain information concerning the formation from which they originated. One of the examinations made upon these samples from a formation is for the presence of oil, i.e., hydrocarbons. Thus, the samples are analyzed to determine the amount of oil which is contained in the formation for purposes of ascertaining whether the formation is capable of producing oil in commercial quantities. Often the samples are analyzed to detect minute quantities of oil for purposes of ascertaining whether the formation could be a source bed of oil. In these analyses, which vary with respect to details, the sample is subjected to solvent extraction to obtain the oil as an extract and the extract is subjected to chromatographic separation to separate significant oil portions of the extract. Thereafter, the chromatographic fractions are examined by penetrative radiation, i.e., infrared and ultraviolet spectra, to determine the characteristics and purity of the material in the fractions.

During mechanical penetration of the formation, contamination of the samples by the drilling fluid can readily occur. The earth formation may be more or less porous and the drilling fluid, at the hydrostatic pressure within the well, may penetrate into the samples. Where an aqueous drilling fluid is employed, contamination of the samples, from the standpoint of determining the presence or quantity of oil within the samples, is of less consequence than where a drilling fluid containing oil is employed. Contamination of the sample with the oil in the drilling fluid creates problems from the standpoint of determining the presence or quantity of the indigenous oil within the sample. Thus, with the possibility that contamination of the sample by the oil in the drilling fluid can occur, the oil removed from the sample by the solvent extraction procedure may or may not have partially or completely originated in the drilling fluid. Thus, where oil has been determined to be present in the sample, it cannot be certain whether this oil is partially or completely representative of indigenous oil in the formation or of oil contaminating the sample from the drilling fluid employed. Accordingly, in the analysis of samples from an earth formation for oil content where a drilling fluid containing oil has been employed during mechanical penetration of the formation, it is essential to know, after application of suitable cleaning procedures, whether the samples have retained contamination by the oil contained in the drilling fluid.

Contamination of earth samples can be ascertained by adding a tracer material to the oil employed in the drilling fluid and analyzing the samples for the tracer material. However, the tracer materials heretofore employed are not always readily detectable in small quantities. Further, detection of these tracer materials have often required more than a minimum of analytical effort. Additionally, many of them have an adverse effect on the physical or chemical properties of the drilling fluid or interfere with logging of the well.

It is an object of this invention to provide a method for detecting contamination of samples from an earth formation by oil from a drilling fluid.

It is another object of this invention to provide a method for detecting contamination of a sample from an earth formation by oil from a drilling fluid without the necessity of providing more than a spectrogram of penetrative radiation as an additional step in the analysis of the sample.

It is another object of this invention to provide a method for detecting contamination of a sample from an earth formation by oil from a drilling fluid which does not affect the chemical or physical properties of the drilling fluid or interfere with the logging of the well.

It is another object of this invention to provide a low cost tracer material in a drilling fluid containing oil which is detectable in small quantities in earth samples contaminated by the drilling fluid.

These and other objects of this invention will become apparent from the following detailed description.

In accordance with the invention, contamination of an earth sample by oil contained within a drilling fluid is determined by adding anthracene to the drilling fluid and thereafter analyzing the earth sample for the presence of the anthracene.

I have found that anthracene is readily detectable by the same analytic procedure involving the measurement of absorption of penetrative radiation employed for determining the presence of indigenous oil in the earth sample. Further, I have found that the anthracene does not affect the physical or chemical properties of the drilling fluid. Additionally, I have found that the anthracene can be detected in small quantities either in the original extract from the earth sample or in the portion of the extract obtained by chromatographic separation.

Anthracene is oil-soluble and readily dissolves in the oils employed for the preparation of oil-containing drilling fluids. Where the oil contained in the drilling fluid penetrates into an earth sample, the anthracene will enter the sample along with the oil. Additionally, the anthracene has a unique absorption spectrum of penetrative radiation. More specifically, the anthracene exhibits sharp absorption bands at 339, 356, and 374 millimicrons in the ultraviolet spectrum and at 10, 10.5, and 13.79 microns in the infrared spectrum. The anthracene, further, is sufficiently similar to the intermediate and heavy aromatic indigenous hydrocarbons contained within an earth formation to accompany these hydrocarbons during chromatographic separation of the extract from a sample from the earth formation. On the other hand, the absorption spectrum of anthracene is different from that of the aromatic hydrocarbons in earth formations. Moreover, the anthracene is detectable in quantities as small as 1.5 micrograms. Thus, in the steps for determining the presence or quantity of oil in the earth samples by measurement of absorption of infrared or ultraviolet absorption, the presence and quantity of anthracene in the oil can be simultaneously determined. Thus, where the presence of anthracene in the oil contained in the earth sample is determined as a result of the detection of the unique absorption bands of the anthracene, it can be considered that the earth sample has been contaminated by oil from the drilling fluid. Moreover, knowing the concentration of anthracene in the oil employed in the drilling fluid, and knowing the amount of anthracene with respect to the amount of oil in the earth sample, the extent to which the total amount of the oil in the earth sample is represented by contamination from the drilling fluid becomes known.

The amount of anthracene employed in the oil from which the drilling fluid is prepared should be sufficient to be detectable by absorption of ultraviolet or infrared radiation. Satisfactory results have been obtained employing concentrations of anthracene of 0.25 percent by weight of the oil content of the drilling fluid. However, greater or lesser concentrations of anthracene may be employed.

The anthracene may be employed in any of the oil-containing drilling fluids commonly employed during mechanical penetration of an earth formation. The drilling fluid may be a full oil phase drilling fluid. In these drilling fluids, the liquid phase of the fluid consists entirely or practically entirely of oil. The drilling fluid may also be an emulsion drilling fluid. In this latter type of drilling fluid, the oil may be the continuous phase or may be the dispersed phase of the emulsion. The oil in any of these drilling fluids may be a mineral, or hydrocarbon, oil, a vegetable oil or an animal oil. Usually, mineral oil such as crude oil, diesel oil, fuel oil, gas oil, or the like is employed.

In the practice of the invention, the anthracene may be added to the oil to be employed in the preparation of the drilling fluid prior to admixture of the oil with any of the other components of the fluid. Thus, where an emulsion drilling fluid is to be used, the anthracene may be added to the oil prior to admixture of the oil with the water. Where a full oil phase drilling fluid is to be used, the anthracene may be added to the oil at any stage of the preparation of the drilling fluid.

Prior to circulation, or otherwise placing, of the drilling fluid in the well, a sample thereof can be taken. This sample can be employed as a control sample to be analyzed for anthracene by the same analytical procedure subsequently employed for oil in the sample obtained from the earth formation. By this means, any difference between the amount of anthracene added to the oil in the drilling fluid and the amount determined by the analytical procedure will become known.

The earth samples for analysis can be collected by conventional means. For example, cuttings removed from the formation by action of the drill bit on the formation during the drilling operation may be collected at the shale shaker. These cuttings may also be collected from the mud pit. Where coring is employed for removal of a sample, either from the side wall or from the bottom of the well, the core is removed from the well within the core barrel.

After collection of the samples, they are cleaned to remove surface accumulation of drilling fluid. Preferably, cleaning is effected as soon as possible after the samples have been collected. For cleaning, it is preferred first to use water and then a solvent for oil mixed with methanol to enable the solvent to penetrate water barriers. The water washes the major portion of adhering drilling fluid from the sample and the solvent for oil, preferably employed in the form of a quick (3 minutes) rinse, removes surface oil from the sample. A suitable solvent for oil comprises benzene, and it can be used in a mixture of 10 parts by volume of benzene and 2 parts by volume of methanol. The samples can then be placed in suitable sealed containers, if desired, to await further analysis.

As a next step in the analysis of the samples after collection and washing, the significant oil content is removed from the samples. In this procedure, the samples are first dried. For drying, the samples may be placed in an oven maintained at a temperature not in excess of about 60° C. Thereafter, the samples are crumbled or crushed. The crushed samples are then extracted with a suitable solvent for hydrocarbons. For example, the sample may be placed in a Soxhlet extractor and extracted with a solvent consisting of 10 parts by volume of benzene and 1 part by volume of methanol. However, for extraction, any other suitable procedure and any other suitable solvent or solvents may be employed. Following extraction of the sample, the extract solution may be weathered by exposing it to a current of air at a temperature of about 40° C. to remove light components from the extract. However, care must be exercised to stop the weathering soon after the solvent has been removed to avoid losing the anthracene. Thereafter, the extract solution is subjected to chromatographic separation.

The chromatographic separation involves passing the extract solution through a column of suitable chromatographic separating agent. For example, the chromatographic separating agent may be alumina or silica gel. The extract solution is poured into the top of the column and is followed by a suitable eluting solvent to separate the solvent contained in the extract, the significant heavy aromatic hydrocarbons containing the anthracene, and any extraneous material dissolved from the sample during the extraction procedure. The eluate containing the significant heavy aromatic hydrocarbons and the anthracene is recovered.

The eluate containing the heavy aromatic fraction and the anthracene is then analyzed for the amount of oil contained therein by a measurement of the absorption of penetrative radiation such as ultraviolet or infrared radiation. This measurement involves passing the radiation through the sample and measuring the extent to which the significant wavelengths of the radiation are absorbed. The extent to which the significant wavelengths are absorbed is a quantitative measure of the amount of the particular component in the sample which absorbs these wavelengths.

As stated hereinabove, anthracene absorbs radiation in the ultraviolet spectrum at 339, 356, and 374 millimicrons and in the infrared spectrum at 10, 10.5, and 13.79 microns. Thus, where the material extracted from the earth samples exhibits absorption at these wavelengths, the sample of the earth material from which the material was extracted contained anthracene. Thus, when these absorption spectra are observed, the sample has been contaminated by the drilling fluid employed during the mechanical penetration operation. The extent to which contamination has occurred will be proportional to the amount of anthracene determined by the radiation absorption procedure.

The accompanying figure is a graph of absorption of ultraviolet radiation by diesel oil and by diesel oil containing dissolved anthracene.

Referring to the figure, the ordinate is absorbance and the abscissa is wavelength in millimicrons. Absorbance is the logarithm of the reciprocal of the percent transmission of the radiation. The curve A is for the absorption of the radiation by the diesel oil containing the dissolved anthracene and the curve B is for the absorption of the radiation by the diesel oil. The anthracene was dissolved in the diesel oil in the amount of 0.25 percent by weight. In the preparation of each of these curves, the diesel oil was dissolved in an amount of 2 percent by weight in normal heptane. Ultraviolet radiation from a source with a continuous spectrum between 300 and 400 millimicrons was passed through each of the solutions of diesel oil. The spectrum of the transmitted radiation was scanned and the intensity thereof was measured continuously between the wavelengths of 300 and 400 millimicrons and recorded as absorbance versus wavelength. As will be observed from curve B in the figure, the diesel oil exhibited very little absorption of the radiation at the wavelengths between 335 and 400 millimicrons. In contrast, curve A representing the diesel oil containing the anthracene shows three strong absorption bands represented by the sharp peaks 10, 11 and 12.

While the invention has been described particularly in connection with the use of anthracene in the oil employed in the preparation of the drilling fluid, other suitable materials may also be employed. For example, satisfactory results are obtained by employing in place of the anthracene other oil-soluble organic materials having distinctive absorption bands and which occur sparsely in earth formations. Suitable other materials of this sort are alkyl anthracenes such as 9 methylanthracene and 9,10 dimethylanthracene. Heavy hydrocarbons ($C_{14}$–$C_{30}$) that have been chlorinated, i.e., containing carbon to chlorine bands, may also be used.

Having thus described my invention, it will be understood that such description has been given by way of illustration and example and not by way of limitation, refeernce being had for the latter purpose to the appended claims.

I claim:

1. In the process of analyzing a sample from an earth formation for indigenous oil, wherein a drilling fluid containing oil is present at said earth formation at the time mechanical penetration of said earth formation to obtain said sample is carried out and contamination of said sample with said oil contained in said drilling fluid can occur, the steps comprising:
   (a) dissolving a compound selected from the group consisting of anthracene, alkyl substituted anthracenes, and chlorinated heavy hydrocarbons in said oil contained in said drilling fluid,
   (b) passing said drilling fluid to said earth formation,
   (c) mechanically penetrating said earth formation and obtaining a sample therefrom,
   (d) recovering said sample from said earth formation,
   (e) washing drilling fluid from the surface of said sample,
   (f) extracting said sample with a solvent for oil to obtain a solution of extract, and
   (g) thereafter analyzing said solution of extract for oil contained therein by passing through said solution penetrative radiation at wavelengths including those which are absorbed by said compound selected from the group consisting of anthracene, alkyl substituted anthracenes, and chlorinated heavy hydrocarbons and measuring the intensity of the transmitted penetrative radiation to determine absorption thereof whereby absorption of said penetrative radiation by said compound selected from the group consisting of anthracene, alkyl substituted anthracenes, and chlorinated heavy hydrocarbons indicates contamination of said sample by said oil contained in said drilling fluid.

2. The process of claim 1 wherein said compound selected from the class consisting of anthracene, alkyl substituted anthracenes, and chlorinated heavy hydrocarbons is anthracene.

3. The process of claim 2 wherein said anthracene is dissolved in said oil in said drilling fluid in an amount of 0.25 percent by weight.

4. The process of claim 2 wherein said penetrative radiation is ultraviolet radiation and said wavelengths include those of 339, 356, and 374 millimicrons.

5. The process of claim 2 wherein said penetrative radiation is infrared radiation and said wavelengths include those of 10, 10.5, and 13.79 microns.

6. In the process of analyzing a sample from an earth formation for indigenous oil, wherein a drilling fluid containing oil is present at said earth formation at the time mechanical penetration of said earth formation to obtain said sample is carried out and contamination of said sample with said oil contained in said drilling fluid can occur, the steps comprising:
   (a) dissolving a compound selected from the group consisting of anthracene, alkyl substituted anthracenes, and chlorinated heavy hydrocarbons in said oil contained in said drilling fluid,
   (b) passing said drilling fluid to said earth formation,
   (c) mechanically penetrating said earth formation and obtaining a sample therefrom,
   (d) recovering said sample from said earth formation,
   (e) washing drilling fluid from the surface of said sample,
   (f) extracting said sample with a solvent for oil to obtain a solution of extract,
   (g) passing said solution of extract through a chromatographic column to separate therefrom eluate containing indigenous oil and containing any of said compound selected from the group consisting of anthracene, alkyl substituted anthracenes, and chlorinated heavy hydrocarbons from said solvent for oil and from any extraneous material dissolved from said sample during said last recited extracting step, and
   (h) thereafter analyzing said eluate of said solution of extract for oil contained therein by passing through said solution penetrative radiation at wavelengths including those which are absorbed by said compound selected from the group consisting of anthracene, alkyl substituted anthracenes, and chlorinated heavy hydrocarbons and measuring the intensity of the transmitted penetrative radiation to determine absorption thereof whereby absorption of said penetrative radiation by said compound selected from the group consisting of anthracene, alkyl substituted anthracenes, and chlorinated heavy hydrocarbons indicates contamination of said sample by said oil contained in said drilling fluid.

7. In the process of analyzing a sample from an earth formation for indigenous oil, wherein a drilling fluid containing oil is present at said earth formation at the time mechanical penetration of said earth formation to obtain said sample is carried out and contamination of said sample with said oil contained in said drilling fluid can occur, the steps comprising:
   (a) dissolving a compound selected from the group consisting of anthracene, alkyl substituted anthracenes, and chlorinated heavy hydrocarbons in said oil contained in said drilling fluid,
   (b) passing said drilling fluid to said earth formation,
   (c) mechanically penetrating said earth formation and obtaining a sample therefrom,
   (d) recovering said sample from said earth formation,
   (e) washing drilling fluid from the surface of said sample,
   (f) extracting said sample with a solvent for oil to obtain a solution of extract,
   (g) weathering said solution of extract to remove therefrom at least a portion of said solvent for oil, and
   (h) thereafter analyzing said solution of extract for oil contained therein by passing through said solution penetrative radiation at wavelengths including those which are absorbed by said compound selected from the group consisting of anthracene, alkyl substituted anthracenes, and chlorinated heavy hydrocarbons and measuring the intensity of the transmitted penetrative radiation to determine absorption thereof whereby absorption of said penetrative radiation by said compound selected from the group consisting of anthracene, alkyl substituted anthracenes, and chlorinated heavy hydrocarbons indicates contamination of said sample by said oil contained in said drilling fluid.

8. In the process of analyzing a sample from an earth formation for indigenous oil, wherein a drilling fluid containing oil is present in said earth formation at the time mechanical penetration of said earth formation to obtain said sample is carried out and contamination of said sample with said oil contained in said drilling fluid can occur, the steps comprising:
- (a) dissolving a compound selected from the group consisting of anthracene, alkyl substituted anthracenes, and chlorinated heavy hydrocarbons in said oil contained in said drilling fluid,
- (b) passing said drilling fluid to said earth formation,
- (c) mechanically penetrating said earth formation and obtaining a sample therefrom,
- (d) recovering said sample from said earth formation,
- (e) washing drilling fluid from the surface of said sample,
- (f) extracting said sample with a solvent for oil to obtain a solution of extract,
- (g) weathering said solution of extract to remove therefrom at least a portion of said solvent for oil,
- (h) passing said solution of extract through a chromatographic column to separate therefrom eluate containing indigenous oil and containing any of said compound selected from the group consisting of anthracene, alkyl substituted anthracenes, and chlorinated heavy hydrocarbons from any of said solvent for oil and from any extraneous material dissolved from said sample during said previously recited extracting step, and
- (i) thereafter analyzing said eluate of said solution of extract for oil contained therein by passing through said solution penetrative radiation at wavelengths including those which are absorbed by said compound selected from the group consisting of anthracene, alkyl substituted anthracenes, and chlorinated heavy hydrocarbons and measuring the intensity of the transmitted penetrative radiation to determine absorption thereof whereby absorption of said penetrative radiation by said compound selected from the group consisting of anthracene, alkyl substituted anthracenes, and chlorinated heavy hydrocarbons indicates contamination of said sample by said oil contained in said drilling fluid.

References Cited by the Examiner

UNITED STATES PATENTS

| | | | |
|---|---|---|---|
| 2,392,620 | 1/46 | Sparks | 250—71 |
| 2,648,010 | 8/53 | Smith | 250—43.5 |

RALPH G. NILSON, *Primary Examiner.*